United States Patent [19]
Geisslinger et al.

[11] 4,030,818
[45] June 21, 1977

[54] MOTION PICTURE SOUND CAMERA

[75] Inventors: Wolfgang Geisslinger, Munich; Peter Ungnadner, Unterhaching, both of Germany

[73] Assignee: AGFA-Gevaert, A.G., Leverkusen, Germany

[22] Filed: May 8, 1975

[21] Appl. No.: 575,631

[30] Foreign Application Priority Data
May 10, 1974 Germany ............... 2422685

[52] U.S. Cl. .................. 352/72; 352/29; 352/172; 352/74
[51] Int. Cl.² ...................... G03B 23/02
[58] Field of Search ............ 352/72, 74, 172, 29, 352/27

[56] References Cited
UNITED STATES PATENTS

| | | | |
|---|---|---|---|
| 2,449,626 | 9/1948 | Suthann | 352/74 |
| 3,297,397 | 1/1967 | Grant | 352/172 |
| 3,421,422 | 1/1969 | Winkler | 352/72 |
| 3,601,479 | 8/1971 | Komine | 352/172 |
| 3,625,125 | 12/1971 | Iida | 352/72 |
| 3,825,327 | 7/1974 | Kosarko | 352/74 |
| 3,880,504 | 4/1975 | Marvin | 354/72 |

OTHER PUBLICATIONS
Def. Pub. T920009, Kosarko, Mar. 5, 1974.

*Primary Examiner*—Monroe H. Hayes
*Attorney, Agent, or Firm*—Michael J. Striker

[57] ABSTRACT

A motion picture sound camera wherein a chamber in the camera housing can receive relatively small containers for regular motion picture film or relatively large containers for sound film. When the chamber receives a large container, the latter deforms a leaf spring which is thereby disengaged from a lever serving to move a component of the sound recording mechanism into engagement with an accessible portion of sound film in the inserted container. The lever can be moved in the opposite direction by a knob which is accessible from without the housing and is turnable by hand between a first and a second position. When moved from the first to the second position, the knob moves the lever and the component to a retracted position while simultaneously stressing a resilient ejector for containers in the chamber, unlocking the door for the chamber and resetting a film frame counter to starting position. When the knob is moved from the second to the first position, the lever moves the component into engagement with film if the chamber contains a container for sound film; at the same time, the knob deactivates the ejector, locks the door in closed position, and moves the frame counter into engagement with a rotary output member of the film transporting mechanism in the camera housing.

17 Claims, 1 Drawing Figure

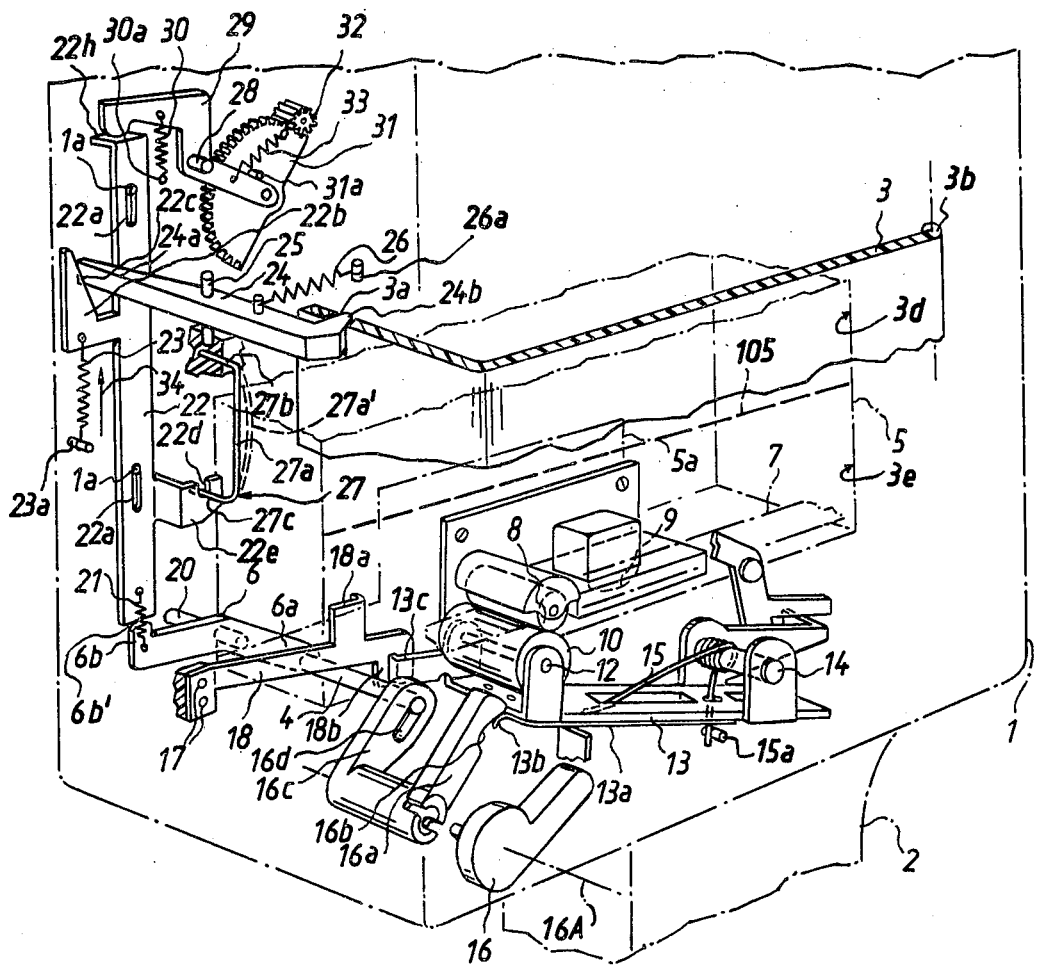

MOTION PICTURE SOUND CAMERA

BACKGROUND OF THE INVENTION

The present invention relates to motion picture cameras in general, and more particularly to motion picture sound cameras. Still more particularly, the invention relates to motion picture cameras which can accept relatively large containers or magazines for sound film or relatively small containers for regular motion picture film without a sound track.

It is shown to provide a motion picture camera with a device which can lock a door for the magazine chamber in closed position. As a rule, the locking device is actuated by hand and performs a single function, namely, of preventing or permitting opening of the door which latter, when moved to open position, affords access to the chamber for film-containing magazines.

SUMMARY OF THE INVENTION

An object of the invention is to provide a motion picture sound camera which may but need not be designed to accept containers or magazines for regular motion picture film without a sound track and wherein the means for effecting the locking or unlocking of the door for the film-containing chamber is capable of performing one or more additional desirable, advantageous and important functions.

Another object of the invention is to provide a motion picture sound camera wherein a container in the chamber can be removed with ease not later than when the door is moved to open position and wherein the sound recording mechanism is rendered operative in automatic response to closing and locking of the door only if the camera contains sound film.

A further object of the invention is to provide a motion picture sound camera wherein the sound recording mechanism cannot be damaged and does not undergo any wear when the chamber of the camera housing contains regular motion picture film without a sound track.

An additional object of the invention is to provide a motion picture sound camera of the above outlined character wherein the film frame counter can be automatically reset to a zero or starting position when the operator decides to unlock the door which affords access to the chamber for film-containing magazines.

Still another object of the invention is to provide a motion picture sound camera wherein a container in the chamber is automatically expelled, at least in part, in response to unlocking but not later than in response to at least partial opening of the door.

A further object of the invention is to provide a versatile actuating device for the mass which serves to lock the door for the film chamber in closed position when the motion picture camera is in use.

The improved motion picture sound camera is designed for use with relatively large containers for motion picture sound film a portion of which is accessible, and preferably for use with such large containers or with smaller containers for regular motion picture film without a sound track. The camera comprises a housing having a chamber for film containers and a door or cover which is movable between open and closed positions to respectively afford and prevent access to the chamber (a container for motion picture sound film is insertable into the chamber in a predetermined orientation so that the accessible portion of the film therein is located in a predetermined portion of the chamber, e.g., in the lower portion of the chamber), a sound recording mechanism mounted in the housing and including a component (e.g., a roller) movable between retracted and extended positions in which the component is respectively remote from and engages the accessible portion of sound film in a container which is properly inserted into the chamber, locking means mounted in or on the housing and being movable between operative and inoperative positions in which the locking means (e.g., a two-armed lever) respectively prevents and permits opening of the cover, and control means which includes actuating means movable between first and second positions (such actuating means may comprise a rotary knob and two levers or analogous control members which are pivotable by the knob), a first transmission or power train (which may include a spring-biased carrier for the component of the sound recording mechanism) operative to respectively move the component to the extended and retracted positions in response to movements of the actuating means to the first and second positions, and a second transmission or power train (which may include a reciprocable slide) operative to respectively move the locking means to operative and inoperative positions in response to movement of the actuating means to the first and second positions.

If the camera is designed for use with larger and smaller containers, a properly inserted smaller container leaves the aforementioned portion of the chamber unoccupied. The camera then further comprises a leaf spring or analogous means for blocking the operation of the first power train in a direction to move the component of sound recording mechanism to the extended position when the aforementioned portion of the chamber is unoccupied.

The camera preferably further comprises ejector means which is operable to expel a container from the chamber. One of the power trains (or a discrete third power train) then comprises means for operating the ejector means in response to movement of actuating means to the second position.

If the camera comprises a film frame counter, one of the power trains (or a discrete further power train) may serve to reset the counter to a starting or zero position in response to movement of actuating means to the second position.

The novel features which are considered as characteristic of the invention are set forth in particular in the appended claims. The improved motion picture sound camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary perspective view of a motion picture sound camera which embodies the invention, with the major part of the housing indicated by phantom lines.

DESCRIPTION OF THE PREFERRED EMBODIMENTS

The drawing shows a portion of a motion picture sound camera having a housing or body 1 the lower wall of which is attached to a pistol grip handle 2. The upper front portion of the handle 2 carries a release button (not shown) and the front wall of the housing 1 supports a picture taking lens, not shown. Portions of one side wall and of the rear wall of the housing 1 constitute a substantially L-shaped cover or door 3 which is attached to the remaining part of the one side wall by means of a hinge 3b and the rear portion of which has a notch 3a for the pallet 24b of a two-armed locking lever 24 pivotably mounted in the housing 1 on a vertical pin 25.

When the cover 3 assumes the illustrated closed position, it seals a chamber 3d for reception of containers or magazines for motion picture film. The chamber 3d is dimensioned in such a way that it can receive a relatively large magazine or container 5 for motion picture sound film 7 or a relatively small container or magazine 105 (the outline of the lower panel of this magazine is indicated by a broken line) containing regular motion picture film without a sound track. The housing 1 has a customary locating or orienting pin which can extend into a recess in the front panel of the larger magazine 5 or into a similar recess in the front panel of a relatively small magazine 105 so that the smaller magazine 105 cannot descend into the lower portion 3e of the chamber 3d, i.e., the portion 3e of the chamber 3d is occupied only when the chamber receives a properly oriented magazine 5.

The portion 3e of the chamber 3d contains a portion of the sound recording mechanism which is to be operative only when the chamber 3d contains a magazine 5 for sound film 7. The just mentioned portion of the sound recording mechanism comprises a rotary element 8 and a recording head 9. These components are mounted in the housing 1 in such a way that they are adjacent to the upper side of an accessible portion of the film 7 when the respective magazine 5 is inserted into and properly oriented in the chamber 3d. To this end, the lower panel of the magazine 5 has a cutout or recess 5a which affords access to a suiable length of sound film 7 therein. The magazine 5 which is shown in the drawing is assumed to have been properly inserted into the chamber 3d prior to closing of the cover 3; therefore, the rotary element 8 and the recording head 9 of the sound recording mechanism are located in the recess 5a and are adjacent to the upper side of the accessible portion of sound film 7.

The sound recording mechanism in the housing 1 further comprises a second rotary component 10 (hereinafter called roller for short) which should engage the accessible portion of sound film 7 opposite the rotary element 8. The roller 10 is mounted on a pin 12 which is journalled in the free end of a carrier lever 13. The latter is pivotable in the housing 1 on a pin 14 and is biased clockwise, as viewed in the drawing, by a torsion spring 15 reacting against a post 15a in the housing 1. When a magazine 5 (e.g., a super-8 sound film magazine) is properly installed and oriented in the chamber 3d, the rotary element 8 and roller 10 bear from opposite sides against the accessible portion of sound film 7 and a gate (not shown) in the front panel of the magazine 5 is in register with the picture taking lens. When the chamber 3d receives a relatively small magazine 105 for regular motion picture film (e.g., regular super-8 film) without a sound track, the portion 3e of the chamber 3d remains unoccupied so that the lower panel of the smaller magazine 105 does not contact the components 8, 9 of the sound recording mechanism. This is insured by the provision of the aforementioned locating pin which prevents the smaller magazine 105 from descending by gravity and from eventually damaging the rotary elements 8 and/or recording head 9 when the housing 1 is held in normal upright position. The recording head 9 is in exact alignment with the sound track of the film 7 in a properly inserted and oriented magazine 5.

The carrier lever 13 forms part of a first transmission or power train and comprises a preferably (but not necessarily) elastic extension 13a (e.g., a leaf spring which can be riveted or soldered to the lever 13) having a protuberance or lobe 13b normally extending into a complementary socket 16b of a control lever 16a which is pivotable in the housing 1 about a horizontal axis 16A making a right angle with the axis of the pivot pin 25 for the locking lever 24 and being parallel to the axes of pins 12 and 14. The carrier lever 13 further comprises a second extension 13c which is movable along an arcuate path having its center of curvature on the axis of the pivot pin 14. The carrier lever 13 can pivot clockwise, as viewed in the drawing (i.e., under the action of the torsion spring 15), only when the control lever 16a assumes a corresponding angular position and when the path for clockwise movement of the extension 13c is free. Such path for movement of the extension 13b can be obstructed by the downwardly extending end portion or lug 18b on a blocking device 18 here shown as a leaf spring which is attached to a portion of the housing 1 by rivets 17 or analogous fastener means. The blocking device or leaf spring 18 further comprises an upwardly exending L-shaped projection or lug 18a. If desired, the leaf spring 18 can be replaced with a lever which is pivotable in the housing about a vertical axis (parallel to that of the pivot pin 25) and is biased clockwise, as viewed from about, by a weak helical spring or the like. The leaf spring 18 is mounted in or extends, at least in part, into the lower portion 3e of the chamber 3d or that it is deformed (i.e., moved from an operative to an inoperative position) by the lower part of a properly inserted and oriented larger magazine 5 to an extent which is necessary to move the lug 18b out of the path of movement of the extension 13c. This insures that the leaf spring 18 cannot interfere with movement of the roller 10 to an extended position, i.e., against the underside of the accessible portion of sound film 7 in such magazine. The magazine 5 in the chamber 3d can lie flat against the lug 18a or against the entire side of the leaf spring 18.

The control lever 16a is made rigid with a second control lever 16c having an elongated closed slot 16d for one end portion of an elongated rod 4 secured to the right-hand arm 6a of a two-armed lever 6 fulcrumed in the housing 1, as at 20, and having a second arm 6b which is coupled to a vertically reciprocable slide 22 by a weak helical spring 21. The fulcrum 20 for the lever 6 is parallel to the common axis 16A of the levers 16a and 16c. These levers can be turned clockwise or counterclockwise by a handgrip member or knob 16 which is accessible from without the housing 1 and performs a plurality of functions including effecting the engagement and disengagement of pallet 24b of the locking lever 24 from the cover 3 and movement of the roller 10 from the illustrated extended to a second or retracted position in which the roller 10 is remote from the rotary element 8 of the sound recording mechanism. The parts 16, 16a, 16c together constitute an actuating means which is pivotable between the illustrated first position and a second position in which the roller 10 assumes the retracted position and the locking lever 24 assumes the inoperative position.

The slide 22 has vertical slots 22a for guide pins 1a of the housing 1 and its lower end face abuts against a rounded portion 6b' of the arm 6b under the action of the coupling spring 21. An intermediate section of the slide 22 has a rearwardly extending portion 22b which is attached to the upper end portion of a helical spring 23; the latter is further attached to a post 23a in the housing 1. The portion 22b of the slide 22 has a suitably inclined cam face 22c which enagages with the left-hand arm 24a of the locking lever 24. When the slide 22 is moved upwardly (arrow 34) in response to movement of actuating means 16, 16a, 16c to the second position, i.e., in response to counterclockwise rotation of the knob 16, the cam face 22c pivots the locking lever 24 in a direction to withdraw the pallet 24b from the notch 3a of the cover 3 so that the cover can be pivoted to the open position in order to afford access to the chamber 3d. The locking lever 24 is permanentaly biased to its operative position by a helical spring 26 which is attached to a fixed post 26a in the housing 1.

The slide 22 forms part of a second power train or transmission which further includes the rod 4, lever 6 and spring 21. This slide further serves as a means for resetting a film frame counter having a rotary member or wheel 31 mounted on one arm of a bell crank lever 29 which is pivotable in the housing on or with a shaft 28. The other arm of the bell crank lever 29 is biased against a portion or platform 22h of the slide 22 by a helical spring 30 which is attached to a fixed post 30a. The counter wheel 31 is connected with a helical spring 33 which is further attached to the respective arm of the bell crank lever 29 and tends to rotate the wheel 31 to a starting or zero position which is reached when a stop pin 31a of the wheel 31 strikes against the lever 29. When a magazine 5 or 105 is properly inserted into the chamber 3d and the cover 3 is closed and locked, the gear teeth at the periphery of the counter wheel 31 mesh with the teeth of a rotary output member or pinion 32 constituting a component of the film transporting mechanism in the housing 1. The concealed side of the counter wheel 31 carries a series of numerals or other indicia which can be observed through a window in the housing 1 so that the user can determine the number of remaining unexposed film frames or the number of exposed film frames. When the camera is in use, i.e., when the film transporting mechanism advances the film 7 or the film in a smaller magazine 105, the pinion 32 causes the counter wheel 31 to rotate clockwise so that the spring 33 is stressed and the stop pin 31a moves away from the adjacent arm of the bell crank lever 29. When the knob 16 is turned clockwise to its second position to move the slide 22 upwardly (arrow 34) and to thereby disengage the pallet 24b from the notch 3a, the platform 22h pivots the bell crank lever 29 clockwise to stress the spring 30 whereby the lever 29 disengages the counter wheel 31 from the pinion 32 and thus allows the spring 33 to reset the wheel 31 by rotating it counterclockwise, i.e., back to the starting or zero position in which the stop pin 31a abuts against the lever 29.

If the user of the camera wishes to remove a large magazine 5, with a partially or completely exposed sound film 7 therein, from the chamber 3d, the release is deactivated to stop the camera motor and the pinion 32. The user thereupon rotates the knob 16 clockwise to thereby pivot the control levers 16a, 16c in the same direction. This causes the control lever 16a to pivot the carrier lever 13 counterclockwise to stress the torsion spring 15 and to move the roller 10 away from the rotary element 8, i.e., to the retracted position. The extension 13c follows the movement of the carrier lever 13 and assumes a retracted position at a level below the lug 18b of the leaf spring 18.

The rotation of knob 16 in a clockwise direction toward the second position results in upward movement of the slide 22 (by way of the control lever 16c, rod 4 and lever 6) so that the cam face 22c pivots the locking lever 24 against the opposition of the spring 26 and the lever 24 withdraws its pallet 24b from the notch 3a, i.e., the cover 3 can be pivoted to open position. The user is then free to remove the magazine 5 whereby the lower portion of the magazine allows the leaf spring 18 to assume its unstressed or operative position, i.e., to enter the portion 3e of the chamber 3d, and to move into the path of movement of the extension 13c on the carrier lever 13. Consequently, the roller 10 is held in the retracted position until and unless the leaf spring 18 is deformed again in response to proper insertion of a large magazine 5.

If the user thereupon decides to insert a smaller magazine 105 for regular motion picture film without a sound track the aforementioned locating pin of the housing 1 prevents the smaller magazine from descending onto the components 8, 9 of the sound recording mechanism so that the lower panel of the smaller magazine 105 remains at a level about the unstressed leaf spring 18. Therefore, the lug 18b continues to block clockwise pivotal movement of the carrier lever 13 so that the roller 10 remains in the retracted position when the chamber 3d contains a smaller magazine, i.e., when the sound recording mechanism can remain inoperative because the film in the chamber 3d does not have a sound track. Once the smaller magazine 105 is properly inserted into the chamber 3d, the user closes the cover 3 and rotates the knob 16 counterclockwise (back to the first position shown in the drawing). The control lever 16a moves its socket 16b away from the lobe 13b on the extension 13a of the carrier lever 13 but this lever continues to hold the roller 10 in the retracted position because the extension 13c bears against the underside of the lug 18b. The knob 16 also turns the control lever 16c which causes the rod 4 to pivot the lever 6 counterclockwise so that the slide 22 can descend under the action of the springs 21 and 23. The cam face 22c then allows the spring 26 to pivot the locking lever 24 to operative position whereby the pallet 24b reenters the notch 3a and locks the cover 3 in the closed position. The spring 30 causes the ball crank lever 29 to bear against the platform 22h while the slide 22 descends so that the lever 29 pivots counterclockwise and moves the counter wheel 31 into mesh with the pinion 32 of the film transporting mechanism. The cameras is then ready for use. The leaf spring 18 is configured in such a way that it does not interfere with movements of the rod 4 in response to clockwise or counterclockwise rotation of the knob 16.

If the user thereupon decides to replace the smaller magazine 105 with a larger magazine 5, the lever 16 is again rotated clockwise to disengage the pallet 24b from the notch 3a, to return the socket 16b into engagement with the lobe 13b, and to cause the slide 22 to reset the counter wheel 31 to starting position as a result of disengagement of wheel 31 from the pinion 32. The door 3 is then moved to open position and the smaller magazine 105 is removed from the chamber 3d. When the user thereupon inserts a larger magazine 5, the components 8, 9 of the sound recording mechanism enter the cutout 5a of such magazine above the accessible portion of sound film 7, and the lower portion of the magazine 5 deforms the leaf spring 18 in the portion 3e of the chamber 3d. Thus, the lug 18b is disengaged from the extension 13c. When the user thereupon rotates the knob 16 counterclockwise to lock the cover 3 in closed position and to engage the counter wheel 31 with the pinion 32, the carrier lever 13 is free to pivot clockwise under the action of the torsion spring 15 and to return the roller 10 the extended position in which the roller 10 bears against the film 7 opposite the rotary element 8.

The slide 22 can further actuate an ejector spring 27 which resembles a yoke having a deformable (flexible) web 27a, a first leg 27b which is anchored in the housing 1 and a second leg 27c which extends into a notch 22d in a laterally extending portion 22e of the slide 22. The web 27a is flexed or cocked and assumes the broken-line position 27a' when the slide 22 is caused to move upwardly in response to unlocking of the cover 3 whereby the web 27a bears against and tends to expel a larger or smaller magazine in the chamber 3d. Such expulsion (which can be a partial expulsion sufficient to allow for convenient grasping of the partly dislodged magazine) takes place as soon as the cover 3 is unlocked and is moved toward its open position; in fact, the stressed web 27c can effect partial opening of the cover 3 as soon as the pallet 24b is withdrawn from the notch 3a. When the slide 22 is allowed to dwell in the lower end position (in which the guide pins 1a are located in the upper end portions of the respective slots 22a), the ejector spring 27 is not deformed so that its web 27a lies flat behind the adjacent panel of a magazine in the chamber 3d, irrespective of whether such magazine is relatively large or relatively small.

It will be noted that the knob 16 performs several important functions including locking the cover 3 in the closed position, unlocking the cover 3 by pivoting the lever 24 against the opposition of the spring 26, causing the ejector spring 27 to expel a larger or smaller magazine in response to unlocking or in response to at least partial opening of the cover 3, moving the roller 10 of the sound recording mechanism to retracted position prior to removal of a magazine 5 (the roller 10 remains in retracted position when the chamber 3d is empty or receives a smaller magazine 105), effecting the movement of counter wheel 31 to starting position in response to movement of the slide 22 in the direction indicated by arrow 34 (i.e., in response to unlocking of the cover 3) and engaging the counter wheel 31 with the pinion 32 of the film transporting mechanism in response to locking of the cover 3 in closed position. The parts 22, 24, 27, 31 move in the aforedescribed manner in response to each and every rotation of the knob 16. On the other hand, the roller 10 moves between its extended and retracted positions only when the chamber 3d is loaded with sound film, i.e., when the blocking device 18 is held in the inoperative position. The two power trains or transmissions consist of simple and inexpensive parts which occupy little room and need not be manufactured (they are preferably mass-produced) with a very high degree of accuracy.

The improved motion picture sound camera is susceptible of many modifications without departing from the spirit of the invention. For example, the second power train including the slide 22, lever 6 and rod 4 need not be used to stress the ejector spring 27 and/or to effect the resetting of counter wheel 31. Thus, the ejector spring 27 can be omitted and the counter wheel 31 or an analogous film frame counter can be reset by hand, in direct response to movement of the locking lever 24 to its inoperative position or in direct response to movement of the door 3 to its open position. Also, the camera may comprise a third power train which stresses the ejector spring 27 in response to movement of actuating means 16, 16a, 16c from the first to the second position. Still further, the camera may comprise a power train which does not include the slide and which serves to reset the counter wheel 31 in response to movement of the knob 16 to its second position, and the control member 16c can be omitted if the rod 4 receives motion directly from the control member 16a. The carrier lever 13 can be replaced by a carrier which is reciprocable between extended and retracted positions. All such modifications will be readily understood upon perusal of the preceding disclosure.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a motion picture sound camera for use with containers for motion picture sound film a portion of which is accessible or with relatively small containers for motion picture film without a sound track, a combination comprising a housing having a chamber for film containers and a cover which is movable between open and closed positions to respectively afford and prevent access to said chamber, a container for motion picture sound film being insertable into said chamber in a predetermined orientation so that said accessible portion of the film therein is located in a predetermined portion of said chamber, whereas a relatively small film container which is inserted in said chamber leaves said portion of said chamber unoccupied; a sound recording mechanism mounted in said housing and including a component movable between retracted and extended positions in which said component is respectively remote from and engages the accessible portion of sound film in a container in said chamber; locking means mounted in said housing and movable between operative and inoperative positions in which said locking means respectively prevents and permits opening of said cover; and control means including actuating means movable between first and second positions, a first power train normally operative to respectively move said component to said extended and retracted positions in response to movement of said actuating means to said first and second positions, and a second power train operative to respectively move said locking means to said operative and inoperative positions in response to movement of said actuating means to said first and second positions said actuating means comprising a handgrip member, a first control member which operates said first power train in response to manual movement of said handgrip member, and a second control member which operates said second power train in response to manual movement of said handgrip member, blocking means for blocking the operation of said first power train in a direction to move said component to said extended position when said first portion of said chamber is unoccupied, said first power train comprising a carrier normally movable back and forth long a predetermined path in response to movement of said actuating means to said first and second positions and said blocking means comprising a device normally extending into said portion of said chamber and into said path to thereby prevent the movement of said carrier in a direction to return said component from said retracted to said extended position in response to movement of said actuating means from said second to said first position, said device being held out of said path by a container for sound film while such container occupies said portion of said chamber; and film transporting means in said housing and a film frame counter movable to and from a starting position, one of said power trains comprising means for effecting the movement of said frame counter to said starting position in response to movement of said actuating means to said second position.

2. In a motion picture sound camera, a combination as defined in claim 1, further comprising ejector means operable to expel a container from said chamber.

3. In a motion picture sound camera, a combination as defined in claim 1, wherein said handgrip member is a rotary knob which is accessible from without said housing.

4. In a motion picture sound camera, a combination as defined in claim 1, wherein said carrier supports said component of said sound recording mechanism and is movable therewith between said extended and retracted positions, and means for yieldably biasing said carrier to said extended position.

5. In a motion picture sound camera, a combination as defined in claim 4, wherein said carrier is movable between said extended and retracted positions and said handgrip member moves said carrier from said extended to said retracted position in response to movement of said handgrip member from a first to a second position.

6. In a motion picture sound camera, a combination as defined in claim 5, said blocking device being held in an inoperative position by a container for sound film in said chamber so that said biasing means is free to move said carrier to said extended position when said chamber contains a container for sound film and said control member moves with said handgrip member from said second to said first position, said blocking device being free to enter said path when a container for sound film is removed from said chamber and not later than when said handgrip member and said control member complete their movement from said first to said second position so that said carrier cannot reassume said extended position when said handgrip member is moved back to said first position while said chamber does not contain a container for sound film.

7. In a motion picture sound camera, a combination as defined in claim 6, wherein said member and said control member are pivotable between said first and second positions.

8. In a motion picture sound camera, a combination as defined in claim 6, wherein said blocking device comprises a spring which normally assumes said operative position and is deformed by a container for sound film in said chamber to thereby assume said inoperative position thereof.

9. In a motion picture sound camera, a combination as defined in claim 1, wherein said second power train comprises means for permanently biasing said locking means to said operative position and a slide which is reciprocable in said housing and comprises cam means for moving said locking means to said inoperative position in response to movement of said actuating means from said first to said second position.

10. In a motion picture sound camera, a combination as defined in claim 9, wherein said locking means comprises a lever which is pivotable between said operative and inoperative positions, said handgrip member being accessible from without housing and said second control member movable by said handgrip member, said second power train further comprising means for moving said slide in a direction to move said lever to said inoperative position through the medium of said cam means when said second control member moves with said handgrip member from said first to said second position.

11. In a motion picture sound camera, a combination as defined in claim 9, further comprising an elastic ejector for containers in said chamber, said ejector having a first portion attached to said slide, a second portion attached to said housing, and a third portion which is deformed by said slide in response to movement of said actuating means to said second position whereby said third portion bears against a container in said chamber and expels such container from said chamber not later than upon opening of said cover.

12. In a motion picture sound camera, a combination as defined in claim 9, further comprising a film transporting mechanism mounted in said housing and having a rotary output member, a film frame counter having a second rotary member movable into and from torque-receiving engagement with said output member, and means for yieldably biasing said second rotary member to a starting position, said slide having a portion arranged to move said second rotary member from torque-receiving engagement with said output member in response to movement of said actuating means to said second position so that said second rotary member is then disengaged from said output member.

13. In a motion picture sound camera, a combination as defined in claim 12, further comprising resilient means for yieldably urging said second rotary member into engagement with said output member so that said second rotary member is automatically engaged with said output member when said actuating means is moved from said second to said first position.

14. In a motion picture sound camera, a combination as defined in claim 13, further comprising a lever pivotably mounted in said housing and having a first arm supporting said second rotary member, said resilient means being arranged to pivot said lever in a direction to move said second rotary member into torque-receiving engagement with said output member and said portion of said slide being arranged to pivot said lever in the opposite direction in response to movement of said actuating means from said first to said second position.

15. In a motion picture sound camera, a combination as defined in claim 9, wherein said second power train further comprises a lever pivotably mounted in said housing and having a first arm and a second arm, and means for coupling said first arm to said slide, said actuating means comprising a control member and means for moving said slide by way of said lever in response to movement of said control member between said first and second positions.

16. In a motion picture sound camera, a combination as defined in claim 15, wherein said coupling means comprises a resilient element.

17. In a motion picture sound camera, a combination as defined in claim 9, further comprising a device for ejecting containers from said chamber and said film frame counter being resettable, said slide having means for actuating said ejecting device and for effecting the resetting of said frame counter in response to movement of said actuating means from said first to said second position.

* * * * *